United States Patent [19]

Kanesaka

[11] Patent Number: 4,930,315
[45] Date of Patent: Jun. 5, 1990

[54] TURBO-CHARGER ENGINE SYSTEM
[75] Inventor: Hiroshi Kanesaka, Kawasaki, Japan
[73] Assignees: Usui Kokusai Sangyo Kabushiki Kaisha, Nagasawa; Kabushiki Kaisha Kanesaka Gijutsu Kenkyusho, Kawasaki, both of Japan
[21] Appl. No.: 198,986
[22] Filed: May 26, 1988
[30] Foreign Application Priority Data
  May 29, 1987 [JP] Japan .................................. 134233
  Nov. 30, 1987 [JP] Japan .................................. 301800
[51] Int. Cl.⁵ ........................................... F02B 37/12
[52] U.S. Cl. ........................................ 60/600; 60/612
[58] Field of Search ................ 60/600, 601, 602, 603, 60/612

[56]  References Cited
  U.S. PATENT DOCUMENTS 2,306,277 12/1942 Oswald .............................. 60/612 X
  2,994,187 8/1961 Kelgard ................................ 60/603
  3,233,403 2/1966 MacInnes et al. .................... 60/600
  3,250,068 5/1966 Vulliamy ........................... 60/612 X
  3,576,102 4/1971 West ................................. 60/612 X
  4,502,282 3/1985 Kanesaka ........................... 60/611 X

FOREIGN PATENT DOCUMENTS
  40728 3/1985 Japan ..................................... 60/612

*Primary Examiner*—Michael Koczo
*Attorney, Agent, or Firm*—Anthony J. Casella; Gerald E. Hespos

[57]   ABSTRACT

A supercharged internal combustion engine arrangement comprising an internal combustion engine having a plurality of turbo-chargers arranged to charge air into the engine and mechanism responsive to an operating condition of the engine for disabling at least one of the turbo-chargers, the arrangement being such that at low speeds all the turbo-chargers are used, and that as the speed rises the at least one turbo-charger is gradually disabled, thereby to improve the responsiveness of the engine.

5 Claims, 10 Drawing Sheets

PRIOR ART

TURBO-CHARGER ENGINE SYSTEM

BACKGROUND OF THE INVENTION

1. Field of the Invention:

This invention relates to turbo-charged engine systems.

2. Description of the Prior Art:

Generally, a well-known turbo-charger engine system has a single turbo-charger designed so as to exhibit the maximum torque at all times at engine speeds required for the engine. Therefore, the charging pressure ratio produced is low at low speeds as shown by the dashed line in FIG. 5. Therefore, the torque produced by the engine is low at low speeds, as shown by solid lines in the same Figure. The energy of exhaust gas is insufficient at an idle engine speed, the turbo-charger speed is low and cannot follow a sudden acceleration of the engine, and a so-called turbo-lag occurs.

Figure 5:
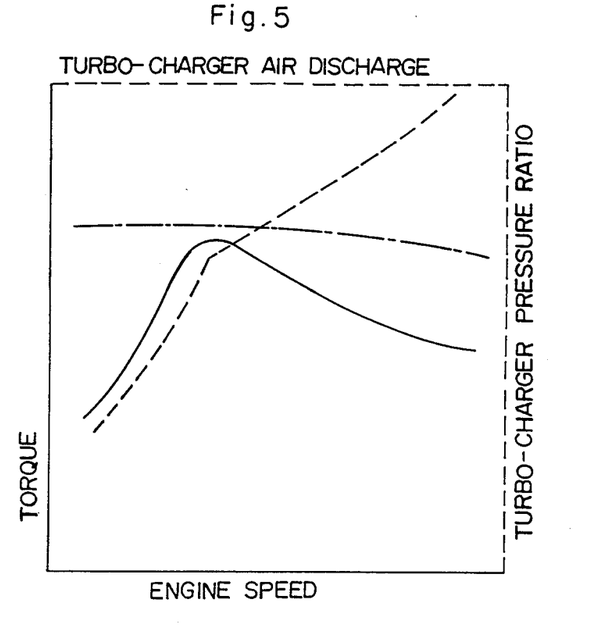
FIG. 5 is a diagram showing the torque curve of an engine system according to this invention and the pressure ratio of the turbo-charger of the engine system.

In an attempt to achieve a torque curve as shown by the chain dotted line in FIG. 5 in which the low-speed torque is increased and the turbo-lag is decreased, there has been proposed a sequential turbo-charger engine system which includes a plurality of 2-chargers including a primary turbo-charger which produces a torque required at low speeds and a secondary turbo-charger which produces a torque supplementing the former torque at high speeds in which turbo-chargers are selectively operated in accordance with engine speed to thereby increase the charging pressure at low speeds and hence the low-speed torque.

Figure 6:
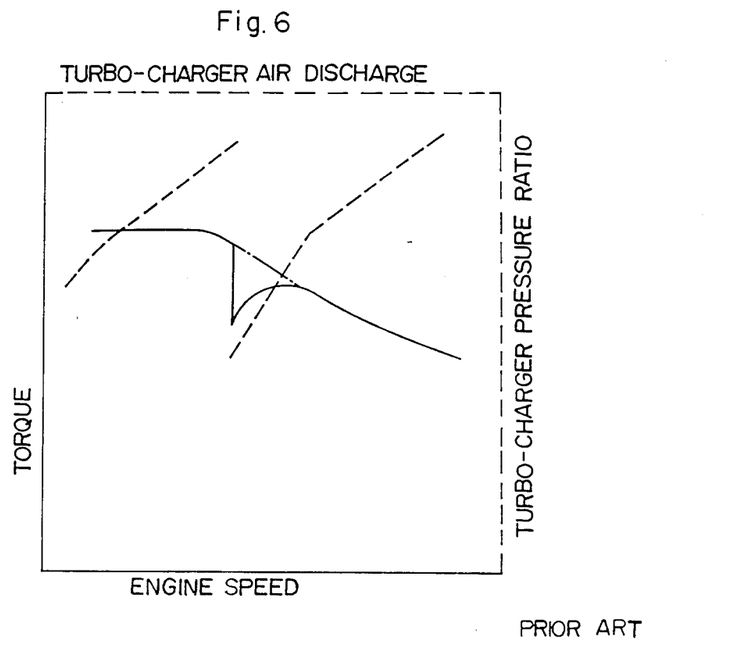
FIG. 6 is a diagram similar to FIG. 5, of a conventional turbo-charger engine system.

During acceleration, when the number of turbo-chargers operated in the above system is increased, the exhaust switching valve is suddenly opened and the secondary turbo-chargers which have previously been at rest are operated. Therefore, the turbine output of the primary turbo-charger decreases due to a sudden increase in the turbine nozzle area and a retardation in the acceleration of the second turbo-chargers causes a temporary decrease in the charging pressure. Thus the charging pressure is lowered to thereby decrease the torque as shown by the solid line in FIG. 6, and the control of the engine output required by the vehicle, shown by a chain-dotted line in the same Figure, becomes temporarily impossible.

SUMMARY OF THE INVENTION

In view of these problems, it is an object of this invention to prevent or minimize a temporary decrease in the torque when the number of turbo-chargers operated at acceleration in the sequential turbo-charger engine system is changed to thereby improve the responsiveness of the engine.

The invention provides a supercharged internal combustion engine arrangement comprising an internal combustion engine having a plurality of turbo-chargers arranged to charge air into the engine and means responsive to an operating condition of the engine for disabling at least one of the turbo-chargers, the arrangement being such that at low speeds all the turbo-chargers are used, and that as the speed rises said at least one turbo-charger is gradually disabled.

In a typical embodiment, when the engine speed increases and the charging pressure produced by a high-pressure turbo-charger exceeds an allowable limit for the engine, an actuator is operated by the inner pressures within an intake manifold of the engine to thereby open a bypass valve to decrease the flow of exhaust gas driving the high-pressure turbo-charger. The pressure of the air charged into the engine is thereby maintained within an allowable limit.

When the engine speed arrives at an intermediate speed and the high-pressure turbo-charger capacity is exceeded, the pressure within the high-pressure exhaust pipe increases to increase further the opening area of the bypass valve. Almost all exhaust gas flowing in the high-pressure exhaust pipe flows through the high-pressure exhaust bypass to thereby stop the function of the high-pressure turbo-charger and supercharging is exclusively performed by a low-pressure turbo-charger.

Therefore, high charging pressure is supplied to the engine at a speed in a range ranging from low-speed to intermediate speed in which range the engine is frequently used. Furthermore, the charging pressure to the engine can be adjusted so as not to exceed the allowable limit to the engine.

In a preferred embodiment, the arrangement is such that the timing of an air intake valve of the engine is varied in response to an operating condition of the engine so as to tend to counteract changes in engine torque resulting from disabling the high-pressure turbo-charger.

BRIEF DESCRIPTION OF THE DRAWINGS

Preferred embodiments of the invention are described below by way of example only, with reference to FIGS. 1 to 16 of the accompanying drawings, in which.

DETAILED DESCRIPTION OF PREFERRED EMBODIMENTS

Figure 1:
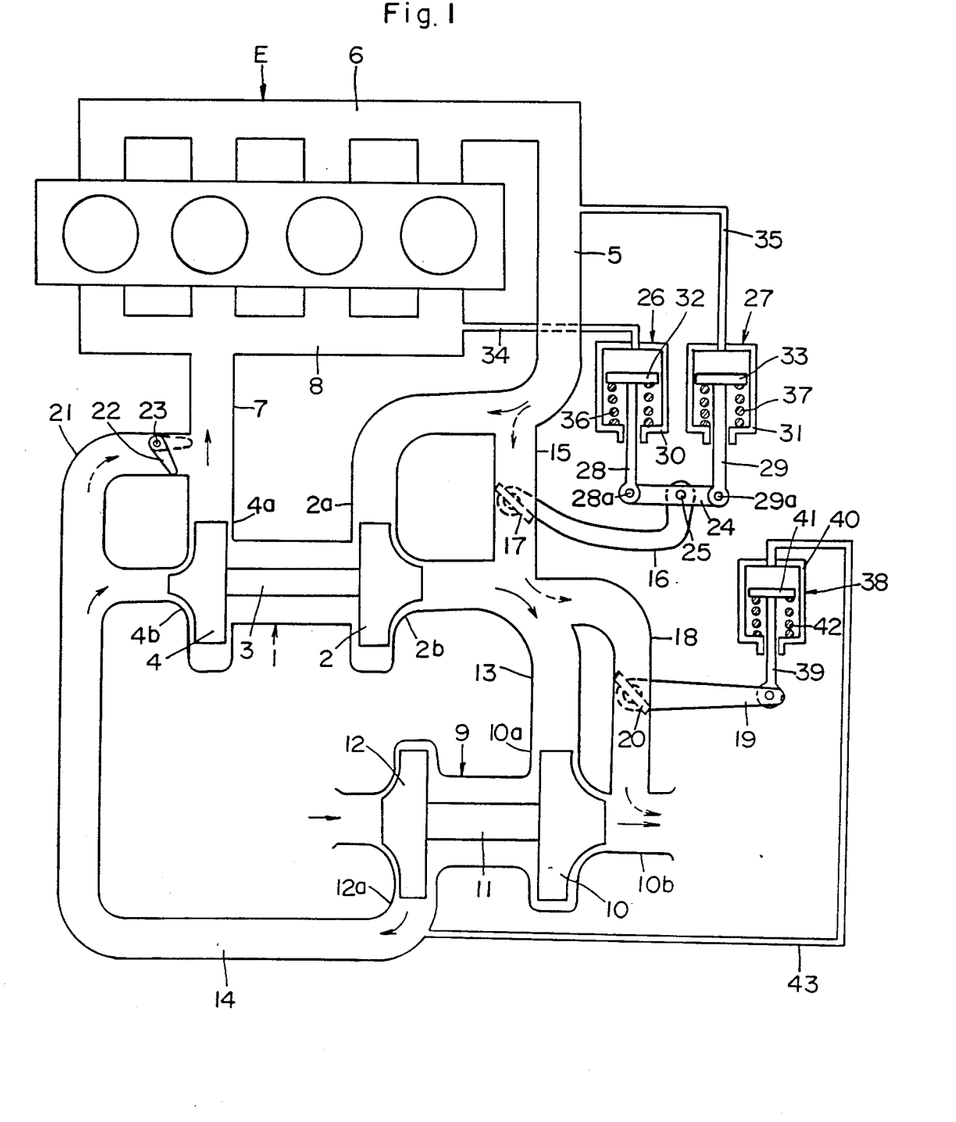
FIG. 1 is the entire schematic of a turbo-charger engine system according to this invention.

FIG. 1 illustrates one example of a turbo-charger engine system according to this invention. High-pressure turbo-charger 1 includes turbine 2 having a small allowable exhaust gas flow, and compressor 4 having a small discharge and rotated by turbine 2 via shaft 3. Turbine inlet 2a communicates with exhaust manifold 6 of engine E via high-pressure exhaust pipe 5. The compressor outlet 4a communicates with intake manifold 8 of engine E via high-pressure charging pipe 7.

Low-pressure turbo-charger 9 includes turbine 10 having a large allowable exhaust gas flow and compressor 12 having a large discharge rotated by turbine 10 via shaft 11. Turbine inlet 10a communicates with turbine outlet 2b of high-pressure turbo-charger 1 via low-pressure exhaust pipe 13. The compressor outlet 12a communicates with compressor inlet 4b of high-pressure turbo-charger 1 via low-pressure charging pipe 14.

High-pressure exhaust pipe 5 communicates with low-pressure exhaust pipe 13 via high-pressure exhaust bypass 15 which has high-pressure exhaust gas overflow valve 17 which is rotated by operating lever 16. Low pressure exhaust pipe 13 communicates with low-pressure turbine outlet 10b via low-pressure exhaust bypass 18 which has low-pressure exhaust gas overflow valve 20 which is rotated by operating lever 19. Low-pressure charging pipe 14 communicates with high-pressure charging pipe 7 via charging bypass 21 which has check valve 22 rotatable around pin 23. Check valve 22 has a function of allowing a flow from low-pressure charging pipe 14 to high-pressure charging pipe 7 but preventing a reverse flow.

Operating lever 16 which operates a high-pressure exhaust gas overflow valve 17 is connected at the other end to e middle portion of a relay lever 24 by pin 35. Piston shafts 28, 29 of actuators 26, 27 are connected by pins 28a, 29a respectively, to the corresponding ends of relay lever 24. In actuators 26, 27 pistons 32 and 33 coupled to piston shafts 28, 29 are inserted into cylinders 30, 31 respectively. The upper end of cylinder 30 communicates with intake manifold 8 of engine E via pipe 34, and the upper end of cylinder 31 communicates with high-pressure exhaust pipe 5 of engine E via pipe 35. Springs 36, 37 are provided between the lower surfaces of pistons 32, 33 and the bottom walls of cylinder 30, 31 respectively.

The operating lever 19 which operates low-pressure exhaust gas overflow valve 20 is by a pin connected at the other end to piston shaft 39 of actuator 38. In actuator 38, piston 41 coupled to piston shaft 39 is inserted into cylinder 40 as in actuators 26, 27 and pushed upwardly by spring 42. The upper end of cylinder 40 communicates with low pressure charging pipe 14 via pipe 43.

Low-pressure exhaust gas overflow valve 20 and actuator 38 therefor are not essential for a diesel engine. This is because in a turbo-charger diesel engine the pressure within the cylinder can usually be restricted to within an allowable limit by restricting a fuel supply quantity per hour.

The operation of the above embodiment will now be described. In the turbo-charger engine system according to this invention, the charging, for example, at 700 rpm, is supplied by high-pressure turbo-charger 1 and a low pressure turbo-charger 9 disposed in series with and downstream of high-pressure turbo-charger 1. The charging pressure under full engine load is at a point a in a charging pressure ratio curve a–b shown by the solid line in FIG. 2. At that time, the charging pressure produced only by low-pressure turbocharger 9 is at a point c in the solid line c–d in the same figure.

Figure 2:
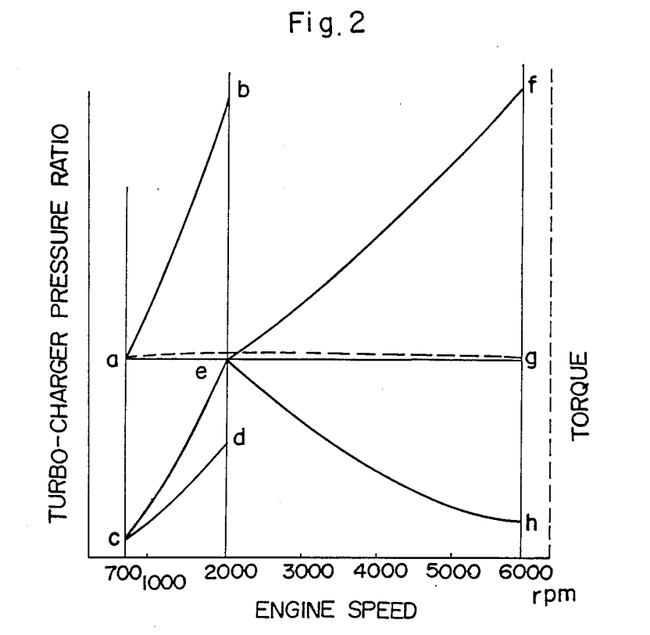
FIG. 2 illustrates the operating state of the engine of FIG. 1.

The charging pressure at point a is the highest allowable engine charging pressure. When the charging pressure exceeds point a, the pressure within the cylinder exceeds the allowable limit of the engine, or knock occurs in the case of a gasoline engine.

If engine speed increases beyond 700 rpm, the charging pressure ratio would exceed the highest allowable charging pressure ratio of the engine and increase as shown by the solid line a–b in accordance with the characteristic of the turbo-charger.

At that time, in the turbo-charger engine system according to this invention, the pressure within high-pressure charging pipe 7 exceeds the highest allowable charging pressure ratio, so that the pressure within cylinder 30 of actuator 26 increases, piston shaft 28 moves downwardly via piston 32 against spring 36 to thereby rotate relay lever 24 counterclockwise around pin 29a. This causes operating lever 16 to rotate clockwise via pin 25 to open high-pressure exhaust gas overflow valve 17 to thereby allow the exhaust gas flowing through high-pressure exhaust pipe 5 to flow into high-pressure exhaust bypass 15, as shown by broken lines. Therefore, the pressure within high-charging pipe is adjusted so as not to exceed the solid line a–e of FIG. 2. At that time, the flow and pressure within low-pressure exhaust pipe 13 increase to energize low-pressure turbo-charger 9 to thereby cause charging pressure, shown by the solid line c–e in FIG. 2, to be produced.

When engine speed further increases, the pressure within high-pressure exhaust pipe 5 increases in accordance with the characteristics of the turbo-charger, the pressure within cylinder 31 of actuator 27 communicating with high-pressure exhaust pipe 5 via pipe 35 increases to push down piston shaft 29 against spring 37 via piston 33 to thereby rotate relay lever 24 clockwise around pin 28a. This causes operating lever 16 to rotate further clockwise to increase the opening area of overflow valve 17 to thereby adjust the charging pressure within high-pressure charging pipe 11 so as not to exceed the line a–e–g of FIG. 2 which is the allowable limit of the engine.

In FIG. 2, when engine arrives, for example, at 2000 rpm, the opening area of overflow valve 17 becomes maximum, almost all the exhaust gas flows through high-pressure exhaust bypass 15 into low-pressure exhaust pipe 13 to thereby lose the function of high-pressure turbo-charger 1 while energizing low pressure turbo-charger 9 to thereby produce the charging pressure shown at point e in FIG. 2. At that time, almost all the charging discharged to low-pressure charging pipe 14 flows through charging bypass 21 to open check valve 22 and flows into high-pressure charging pipe 7.

In FIG. 2, when engine speed exceed 2000 rpm (or when knock occurs due to excessive charging pressure in a gasoline engine), charging pressure will increase beyond the allowable limit of the engine, as shown by e–f in FIG. 2. Therefore, the pressure with low-pressure changing pipe 14 pushes down piston 41 within cylinder 40 of actuator 38 and piston shaft 39 via pipe 43 against spring 42 to rotate operating lever 19 clockwise to thereby open low-pressure exhaust gas overflow valve 20 having the same structure as a well-known waste gate. This maintains the highest allowable charging pressure of engine at e–g.

The required air quantity for the engine under partial load, for example, ⅓ load at 6000 rpm, decreases as shown by the solid line e–h in FIG. 2. Under engine load or torque below the solid line e–h, actuators 26, 27 do not fully open high-pressure exhaust gas overflow valve 17, and exhaust gas energizes high-pressure turbo-charger turbine 1 while flowing into low-pressure turbo-charger 9.

At that time, high pressure turbo-charger 1 is in a state close to full power operation, so that when engine load or torque is desired to increase rapidly, the accelerator pedal is stepped on to open the throttle valve to thereby increase an intake air quantity to the engine. This increases fuel supply to thereby increase the exhaust gas pressure. This causes actuator 27 communicating via pipe 35 of exhaust manifold 6 to be operated to open high-pressure exhaust gas overflow valve 17 via operating lever 16, so that both high-pressure and low-pressure turbo-chargers 10 and 9 are immediately accelerated within time lag to thereby cope rapidly with engine load fluctuations.

Figure 3:
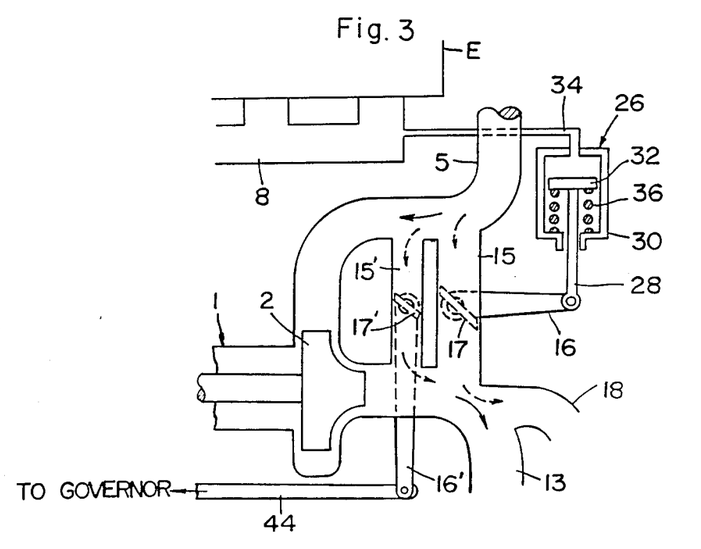
FIG. 3 is a partial cross section view of another embodiment.

An example shown in FIG. 3 employs the following structure instead of actuator 27 which operates high-pressure exhaust gas overflow valve 17.

Secondary high-pressure exhaust bypass 15' is provided in parallel to high-pressure exhaust bypass 5 and communicates between high-pressure exhaust pipe 5 and low-pressure exhaust pipe 13. Secondary high-pressure exhaust gas overflow valve 17' is provided in bypass 15' and rotated by operating lever 16', the other end of which is connected via link 44 to a governor (not shown) which is rotated by engine E to thereby operate at an engine speed at which actuator 27 operates.

Therefore, when actuator 26 operates and engine E arrives then at the operating speed of the governor, link 44 is drawn leftward in FIG. 3 by the governor operation to thereby open secondary high-pressure exhaust gas overflow valve 17' via operating lever 16' so that almost all the exhaust gas within high-pressure exhaust pipe 5 flows through high-pressure exhaust bypass 15 and secondary high-pressure exhaust bypass 15' to thereby lose the function of high-pressure turbo-charger 1 and simultaneously energize low-pressure turbo-charger 9 as in the previous embodiment.

Figure 4:
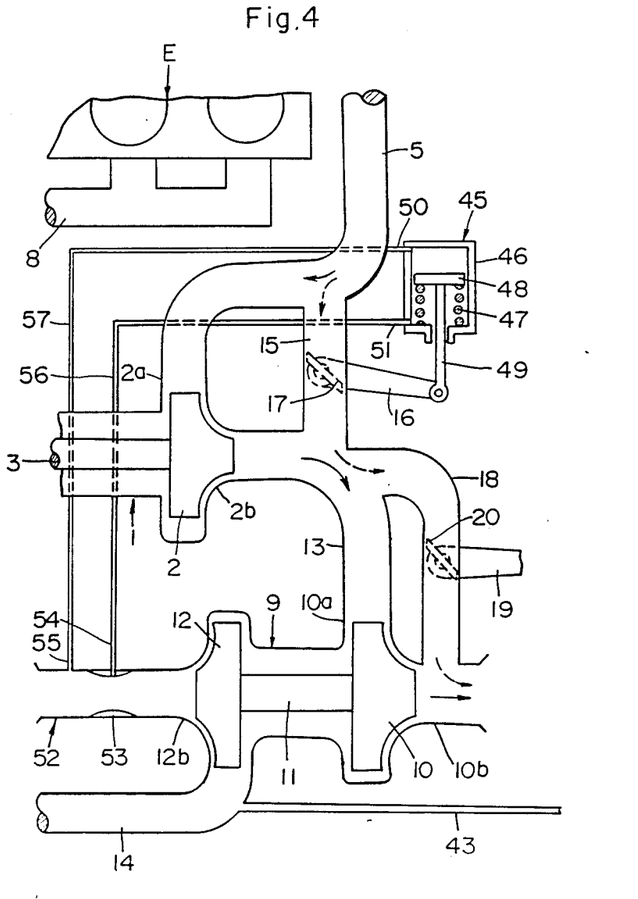
FIG. 4 is a partial cross section view of a third embodiment.

An example shown in FIG. 4 is a modification of control means for the actuator which operates high-pressure exhaust gas overflow valve 17. Actuator 45 which operates the operating lever 16 of overflow valve 17 couples piston shaft 49 of piston 48 pushed upwardly by spring 47 within cylinder 46 to an end of operating lever 16. Pressure take-in ports 50, 51 are provided upper and lower ends respectively of cylinder 46.

Venturi tube 52 is provided at inlet 12b of compressor 12 of low-pressure turbo-charger 9. Pressure extraction outlets 54,55 provided at choke portion 53 and a portion directly before the choke portion 53 communicate with pressure inlets 51, 50 of actuator 45 via pipe 56, 47 respectively.

Therefore, the air flow passing through Venturi tube 52 is extracted as a pressure by pressure extraction outlet 54,55 and applied via pipes 56, 57, pressure inlet 51, 50 into the spaces above and below piston 48 of actuator 45. Therefore, the pressure differential between pressure outlets 54 and 55 of Venturi tube 52 can move piston shaft 49 to a position where the differential pressure equilibrate with the force of the spring 47 to thereby adjust the opening of overflow valve 17 via operating lever 16.

Therefore, according to the embodiment of FIG. 4, high-pressure exhaust gas overflow valve 17 can continuously be controlled in accordance with the operating state of the engine at the full engine speed, for example, higher than 700 rpm.

High charging pressure is supplied to the engine of the invention at an engine speed ranging from a low speed to an intermediate speed at which speed the engine is most frequently used, and the charging pressure to the engine can be controlled so as not to exceed the allowable limit of the engine. The turbo-charger engine system according to this invention has a simple structure and excellent responsiveness improves the low-speed torque and avoids knocking.

Figure 7:
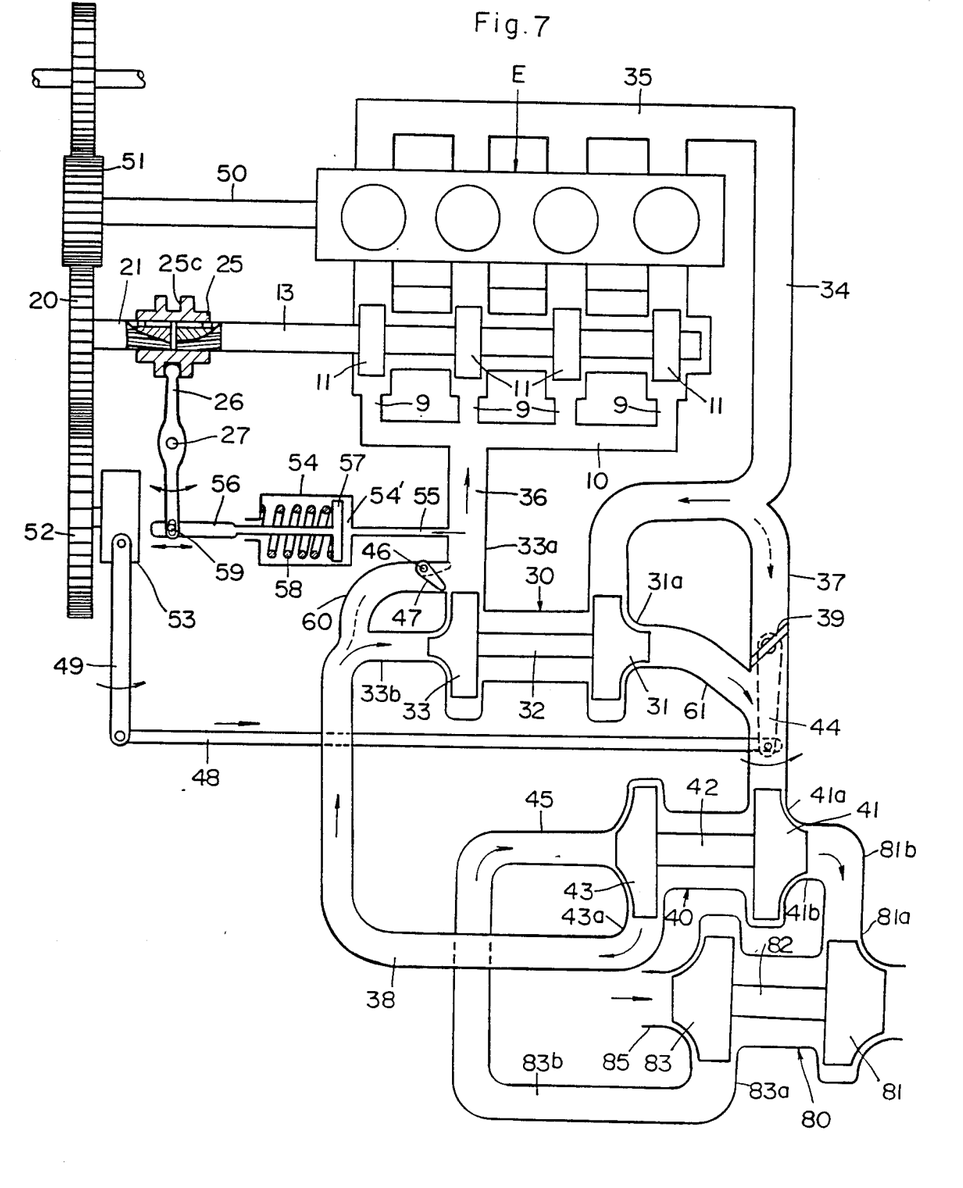
FIG. 7 is the entire schematic of another turbo-charger engine system according to this invention.

The turbocharger engine system of FIG. 7 comprises an engine; a plurality of turbo-chargers connected in series with the engine in a communication manner; an exhaust switching valve provided in an exhaust bypass communicating between an exhaust pipe and a low-pressure exhaust-pipe; a check valve provided in a charging bypass communicating between a low-pressure charging pipe and a charging pipe; an actuator operative in accordance with the state of engine operation for opening the exhaust switching valve; and a rotary valve provided in an intake passageway to the engine, wherein the rotary valve is closed in the course of an intake stroke via the opening and closing timing adjusting mechanism operative in accordance with the charging pressure. It is noted that, in order to prevent high-charging pressure discharged from the high-pressure turbo-charger at intermediate and high engine loads from exceeding the highest allowable pressure within the engine, the timing at which the rotary valve is opened is advanced to decrease the compression ratio to thereby shorten the length of the intake stroke.

As the engine speed further increases and the charging capacity of the high-pressure turbo-charger is exceeded, the exhaust switching valve is gradually opened in accordance with an increase in the engine speed to operate the low-pressure turbo-charger alone. In that case, there is no delay in the acceleration of the low-pressure turbo-chargers, but the charging pressure drops temporarily. Accordingly, the timing at which the rotary valve is closed is retarded to increase the length of the intake stroke to thereby prevent a decrease in the quantity of intake air to the engine and hence a decrease in the torque.

FIG. 7 illustrates a further turbo-charger engine system according to this invention having a rotary air-intake valve with an opening and closing timing adjusting device. High-pressure turbocharger 30 includes turbine 31 having a small acceptable exhaust gas flow and a compressor 33 rotated by shaft 32 and having a small discharge capacity. Turbine inlet 31a communicates with exhaust manifold 35 of engine E via exhaust pipe 34. Compressor outlet 33a communicates with intake manifold 10 of engine E via intake pipe 36.

Low-pressure turbo-chargers 40 and 80 include turbines 41 and 81 which have a large acceptable exhaust gas flow and compressors 43 and 83 having a large discharge capacity and rotated by shafts 42 and 82, respectively. Turbine inlet 41a communicates with the discharge outlet 31b of high-pressure turbo-charger 30 via low-pressure discharge tube 61 and compressor outlet 43a communicates with compressor inlet 33b of high-pressure turbo-charger 30 via low-pressure charging pipe 38. Low-pressure exhaust pipe 81b communicates between the turbine outlet 41b of turbo-charger 40 and the turbine inlet 81a of turbo-charger 80 while low-pressure pipe 83b communicates between the compressor outlet 43a of turbo-charger 40 and the compressor inlet 45 of turbo-charger 80.

Exhaust bypass 37 communicates with exhaust pipe 34 and low-pressure exhaust pipe 61. Bypass 37 has an exhaust switching valve 39 which is rotated by lever 44. Charging bypass 60 communicates with charging pipe 36 and low-pressure charging pipe 38 which communicates between the compressor outlet 43a of low-pressure turbo-charger 40 and the compressor inlet 33b of high-pressure turbo-charger 30. Bypass 60 has a check valve 47 rotatable around pin 46. Check valve 47 has a function of allowing a flow from pipe 38 to 36 but hindering a reverse flow.

Exhaust switching valve 39 is connected to an actuator or governor 53 via lever 49 and link 48 coupled to lever 44. Governor 53 is rotated by gear wheel 52 via drive shaft 50 rotated by engine E, gear wheel 51 and timing gear wheel 20. When engine E arrives at a predetermined rotational speed, governor 53 rotates its lever 49 counterclockwise to push link 48 rightward in FIG. 7 and rotates lever 44 counterclockwise to thereby open discharge exhaust switching valve 39.

Pneumatic cylinder 58 is connected at one end to pipe 36 via pipe 55 so as to apply pneumatics against spring 58 to piston 57 fixed to an end of rod 56 inserted through the other end of the pneumatic cylinder 54. Rod 56 is connected to the other end of regulation lever 26 via pin 58.

Figure 8:
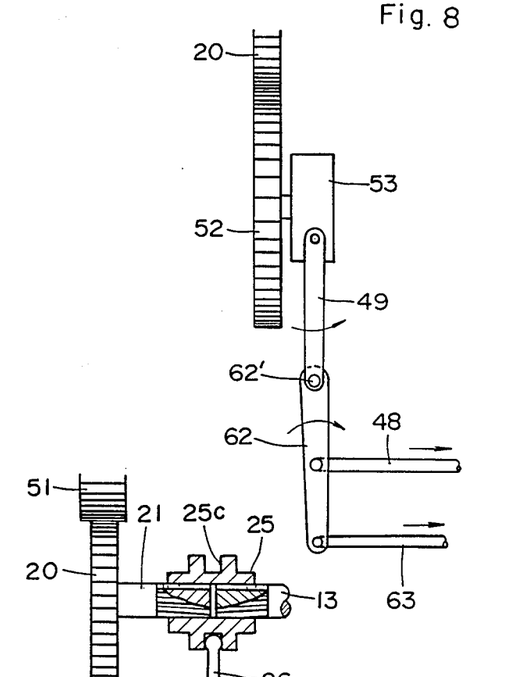
FIG. 8 illustrates a part of another embodiment of a turbo-charger engine system according to this invention.

FIG. 8 shows another embodiment of this invention. Leer 49, rotated by governor 53, supports auxiliary lever 62 rotatable by pin 62' at one end of lever 49. Link 63 is connected to the other end of auxiliary lever 62 and moves, for example, in conjunction with an engine load regulator (not shown) such as an accelerator pedal in the case of a vehicle. Link 48 is also connected to the middle portion of auxiliary lever 62. Thus if lever 49 is rotated counterclockwise by governor 53 when engine E has arrived at a predetermined rotational speed, auxiliary lever 62 is turned clockwise around the junction point between lever 62 and link 63 to push link 68 rightward to thereby rotate lever 44 counterclockwise and open switching valve 39. Therefore, as the load increases, link 63 moves further rightward to rotate auxiliary lever 62 counterclockwise, so that link 48 is pushed rightward in FIG. 7 at relatively low speeds under high load and at relatively high speeds under low load to rotate lever 44 counterclockwise to open valve 39.

Figure 9:
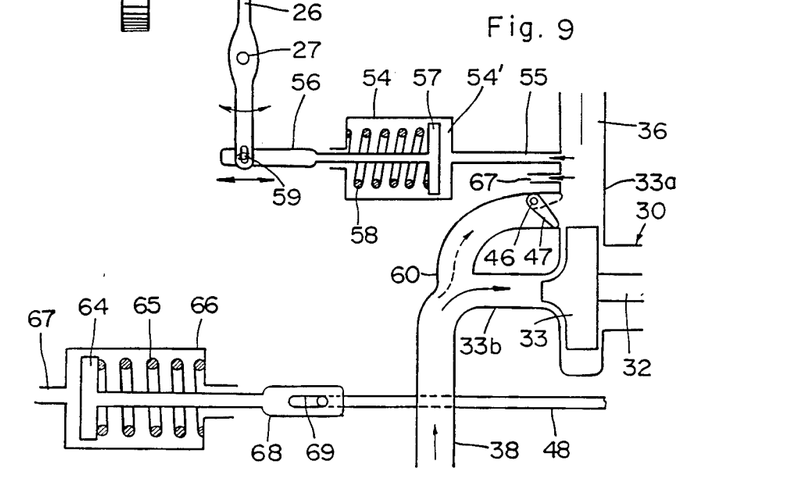
FIG. 9 illustrates a part of a further embodiment of a turbo-charger engine system according to this invention.

FIG. 9 shows a further embodiment of this invention in which exhaust switching valve 39 is opened by the charging pressure generated by high-pressure and low-pressure turbo-chargers 30, 40, and 80. Piston 64 is provided within pneumatic cylinder 66 so as to be pushed leftward by spring 65 in FIG. 3, cylinder 66 communicating with charging pipe 36 via pipe 67. Rod 68 having elongated hole 69 is connected to the other end of piston 64 from pipe 67. Link 48 is fitted at one end into elongated hole 69 and coupled at the other end to lever 44 of switching valve 39. In the case of the FIG. 3 embodiment, no elements such as gear wheel 52, governor 53 and lever 49 shown in FIG. 1 are required. By the above structure, lever 44 is turned counterclockwise by the rightward movement of piston 64 to open exhaust switching valve 39.

Figure 10:
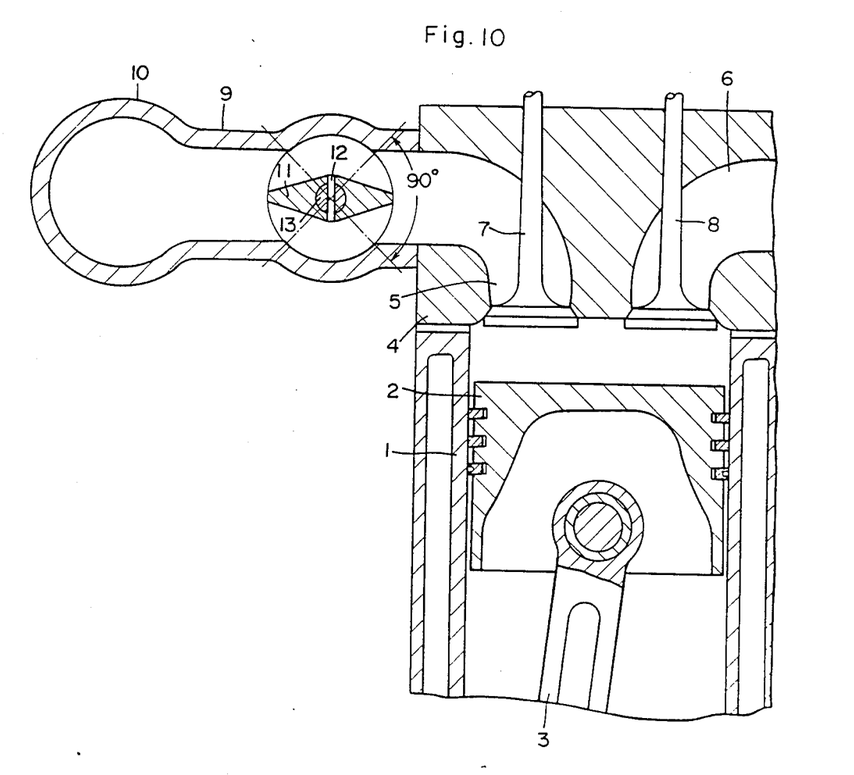
FIG. 10 is a cross section view of a portion of the engine of FIG. 7 which includes an intake passageway with the cylinder and the rotary valve of the engine.

As shown in FIG. 10, a turbo-charger engine system according to this invention basically includes a 4-cycle engine which comprises a cylinder 1 within which a piston 2 is accommodated slidably with a connection rod 3 which rotates a crank shaft (not shown). Provided at an intake port 5 and an exhaust port 6 in cylinder head 6 are respectively intake valve 7 and exhaust valve 8 which are opened and closed synchronously with the crank shaft of the engine by a well-known valve drive mechanism. The intake passageway is composed of an intake branch pipe 9 communicating with intake port 5, and an intake manifold 10 provided at one end of intake pipe 9. A rotary valve 11 is provided in intake branch pipe 9 as a control valve driven by a gear wheel transmission mechanism via the crank shaft of the engine.

Figure 11:
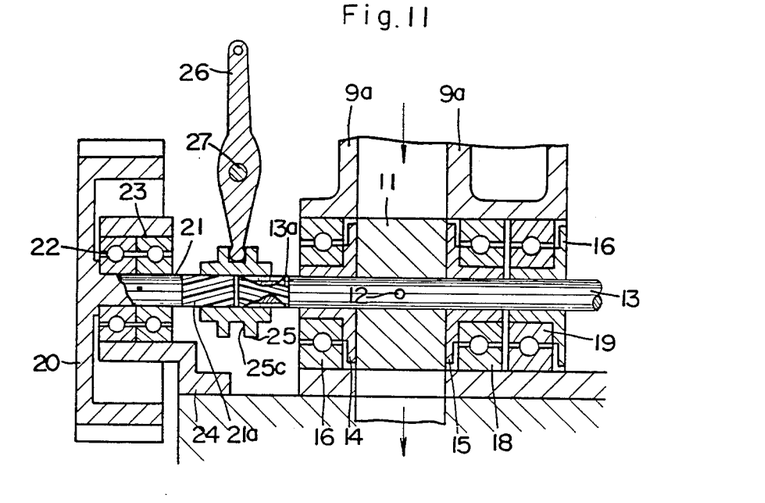
FIG. 11 is a cross section view of an opening and closing timing adjusting device for the rotary valve.
Figure 12:
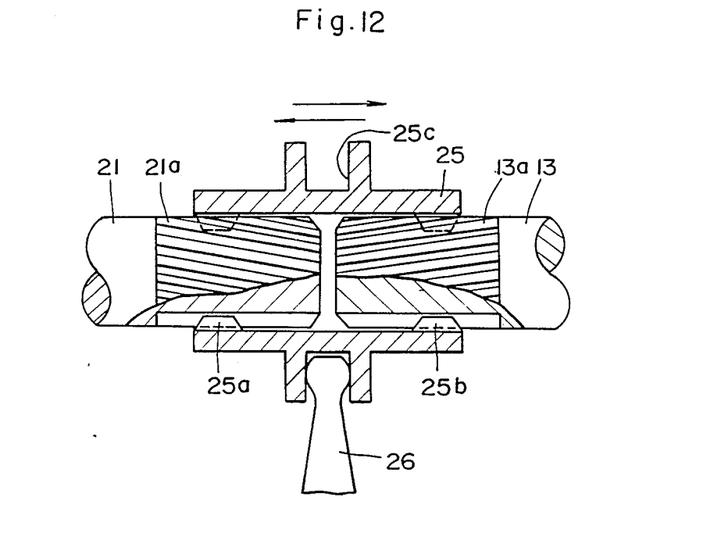
FIG. 12 is a cross section view of the essential portion of the opening and closing timing adjusting device.

FIGS. 11 and 12 illustrate an opening and closing timing adjusting device which includes a drive mechanism for rotary valve 11 which is supported by drive shaft 13 fixed by pin 12 to rotary valve 11 within valve body 9a formed in the middle portion of intake branch tube 9. Drive shaft 13 is supported by a plurality of bearings 17, 18 and 19 via a pair of sleeves 14 and 15 disposed so as to support rotary valve 11 on each side and a single sleeve 16 within valve body 9a. Shaft 13 had left-hand thread helical sprines 13a at one end.

Timing gear wheel 20 coupled via a gear wheel mechanism to the crank shaft (not shown) is integral with rotational shaft 21 which is supported via bearings 22 and 23 to bracket 24 which is fixed to the engine. Shaft 21 has at an end right-hand thread helical sprines 21a which are coupled to left-hand thread helical sprines 13a via adjustable coupler 25 which has inner protrusions 25a and 25b engageable with both the sprines.

Adjusting lever 26 is supported by shaft 27 and fitted at one end into a recess 25c in coupler 25. Thus, for example, in FIG. 10, if coupler 22 is moved leftward by adjusting lever 26, drive shaft 13 is shifted angularly in a predetermined direction relative to rotational shaft 21 while, if coupler 22 is moved rightward, shaft 13 can be shifted angularly in the reverse direction. Therefore, by the axial movement of coupler 22, the rotational timing of drive shaft 13 is altered to thereby adjust the opening and closing timing of rotary valve 11.

As shown in FIG. 10, rotary valve 11 is set such so as to be opened and closed at intervals of about 90 degrees and driven at one half of the rotational speed of the crank shaft by timing gear 20.

The intake stroke interval of the engine is about 180 degrees of the crank shaft rotation and, therefore, rotary valve 11 has a valve-open interval of an about 180 degree rotational angle of the crank shaft.

Figure 13A:
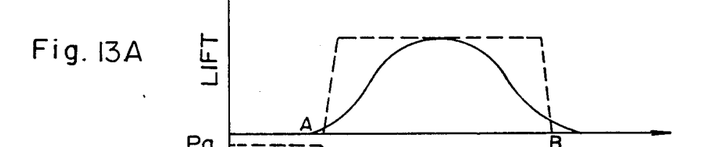
FIG. 13A illustrates a lift of the intake valve and rotary valve of the engine of FIG. 7 at low and intermediate speed rotation.
Figure 13B:
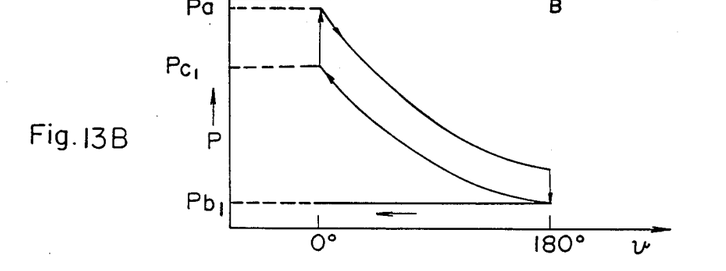
FIG. 13B is a p-v curve of the engine of FIG. 7 at that engine speed.

The operation of the embodiment will now be described. In the inventive turbo-charge engine system, air charging at a low speed, for example, of about 500 rotations/minute (rpm), is performed by high-pressure turbo-charger 30 and low-pressure turbo-chargers 40, 80 disposed in series upstream of turbo-charger 30 and that charging pressure under the full engine load is at a point a in the delivery pressure ratio curve a–c shown by broken lines in FIG. 15. The charging pressure ratio generated by low-pressure turbo-chargers 40 and 80 at that time is at a point j in the broken line j–k–f–g in the same Figure. In that case, the charging pressure at point a does not exceed the maximum allowable pressure Pa of the engine even in a regular cycle shown in FIG. 13B. The charging pressure within intake pipe 36 is low, the pressure within chamber 54' of pneumatic pressure cylinder 54 is also low, and the force of spring 58 to push piston 57 rightward is greater than the pressure in chamber 54' to push piston 57 leftward, so that adjustable coupler 25 of the opening and closing timing adjusting device is at a position to the left of a reference. As shown in FIG. 13A, the opening and closing timing of the intake valve 7 at the intake stroke is set so as to be the same as that of rotary valve 11, so that as shown in FIG. 13B the p-v diagram is quite the same as that of a regular engine and the torque is at a point b in the torque curve (solid line b-e-h) in FIG. 15.

Figure 14A:
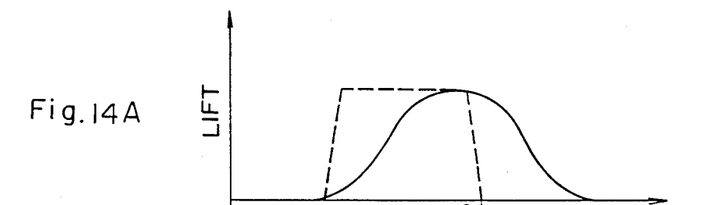
FIG. 14A illustrates a lift of the intake valve and rotary valve of the engine of FIG. 7 at high-speed rotation.
Figure 14B:
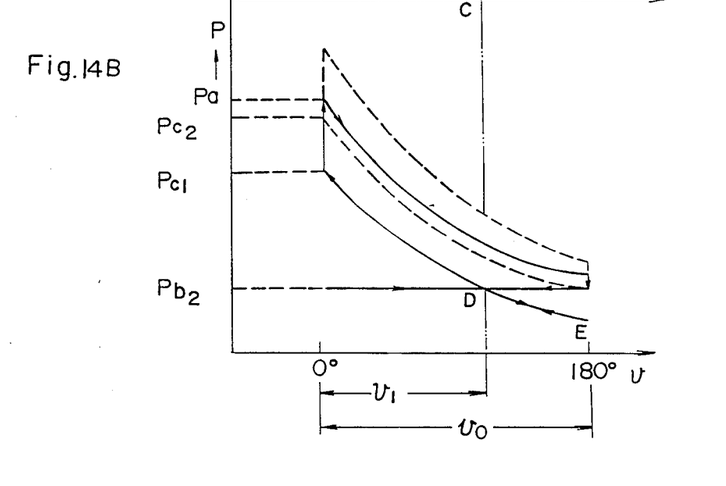
FIG. 14B illustrates a p-v curve on the engine of FIG. 7 at the engine speed.
Figure 15:
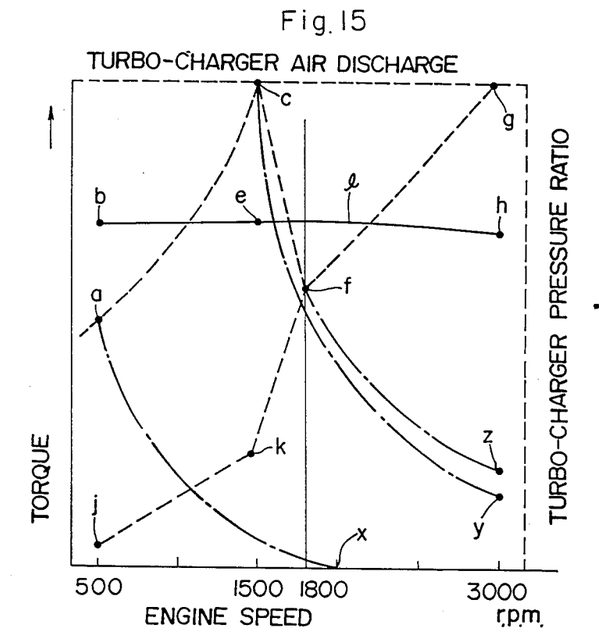
FIG. 15 is a torque curve of the engine of FIG. 7.

The charging pressure generated by the cooperating high-pressure and low-pressure turbo-chargers 30 and 40 under full load is increased along the delivery pressure ratio curve a-c of FIG. 15 with an increase in the engine speed. As shown by broken lines in FIG. 14B, the highest pressure would exceed the allowable engine pressure Pa when the engine is driven in a regular cycle at the charging pressure at a point C which represents an engine speed of 1500 rotations/minute. Namely, when the charging pressure increases from $Pb_1$ in FIG. 13B to $Pb_2$ in FIG. 14B, the compression pressure increases from $Pc_1$ to $Pc_2$ as shown by broken lines in FIG. 14B in the case of a regular engine, so that the highest pressure would exceed the highest allowable engine pressure by combination so long as this condition is maintained.

However, the opening and closing timing of intake valve 7 is constant while the pressure in the pneumatic cylinder 54 increases with an increase in the pressure in charging pipe 37, so that piston 57 moves leftward against spring 58 to thereby rotate adjusting lower 26 clockwise around shaft 27. This causes adjustable coupler 25 rightward to advance the closing timing of rotary valve 11 to a point C in FIG. 14A in the course of the intake stroke. This causes the intake pressure to be adiabatically expanded from a point D in the course of the intake stroke and to lower to a value at point E at the bottom dead center and thus the temperature also lowers. Then the compression stroke starts from point E and as a result of adiabatic compression, the pressure and the temperature become again equal to those at the intake stroke at point D, and the pressure $Pc_1$ at the top dead center in compression stroke becomes equal to that in FIG. 13B.

Therefore, the combustion pressure can be adjusted so as not to exceed the highest allowable pressure Pa within the engine.

Figure 16:
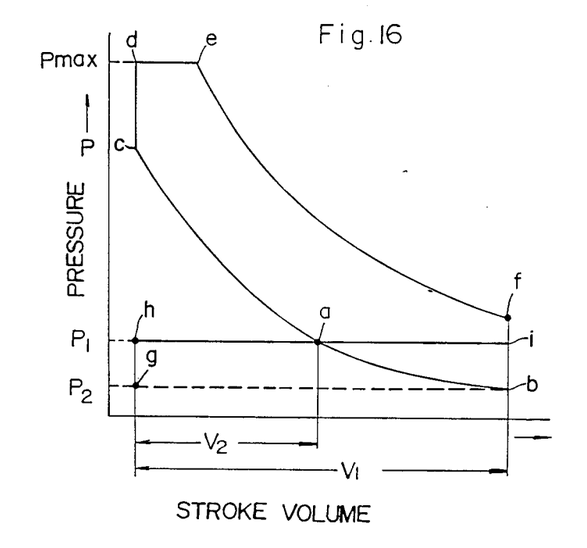
FIG. 16 illustrates the details of the p-v curve of the engine of FIG. 7.

As shown in FIG. 16, the p-v diagram at that time is similar to a broken line g-b in the vicinity of an engine speed of 500 rotations/minute in which pressure $P_2$ corresponds to that point a in FIG. 15. The curve portion from point g to point b in FIG. 16 denotes the intake stroke, and the curve portion from point b to point c the compression stroke. Thus a regular Sabathe' cycle is formed which is represented by the cycle d–e-f-b-g.

When engine speed increases to 1500 rpm, the charging pressure generated by high-pressure turbo-charger 30 and low pressure turbo-chargers 40, 80 increases to a point c, as shown in FIG. 15. The pressure corresponding to this pressure is represented by $P_1$ in FIG. 16 in which the intake stroke starts from point h and rotary valve 11 is closed at point a as mentioned above. Therefore, the air within the cylinder performs an adiabatic expansion from point a; and lowers to point b, namely, $P_2$ at the bottom dead center of the intake stroke. The compression stroke starts from point b, the pressure again equals to $P_1$ at point a, the compression stroke ends at point c. The cycle ends by following the course d-e-f-i-h of the same p-v diagram as the Sabathe' cycle when the charging pressure is at $P_2$. The area at the p-v diagram when the engine speed is in the vicinity of 500 rpm is that of a figure obtained by connecting the points b,c, d, e, f and b in this order in the p-v diagram and substantially equal to that figure obtained by combining points a, c, d, e, f, i, and a in the p-v diagram when the engine speed is in the vicinity of 1500 rpm. As shown by points b and e in the torque curve of FIG. 15, the torque in the vicinity of an engine speed of 500 rpm is substantially equal to that at an engine speed of 1500 rpm.

When engine speed exceeds 1500 rpm, lever 49 of governor 53 is turned counterclockwise and lever 44 is also turned counterclockwise by link 48 to open exhaust switching valve 39.

At that time, if lever 49 is turned counterclockwise by governor 53 in the embodiment of FIG. 8, auxiliary lever 62 is turned clockwise around the junction point between lever 62 and link 63 to push link 48 rightward, to rotate lever 44 counterclockwise and open exhaust switching valve 39. Therefore, with a higher load, link 63 is moved further rightward to rotate auxiliary lever 62 counterclockwise, so that link 48 opens valve 39 at a relatively low speed under high load and at a relatively high speed under low load.

In the embodiment of FIG. 9, an increase in the pressure within charging pipe 36 causes piston 64 in the pneumatic cylinder 66 coupled to pipe 67 to be pushed rightward in FIG. 9 against spring 65 to rotate lever 44 counterclockwise via link 48 fitted at one end to elongated hole 69 in rod 68 to thereby open switching valve 39.

Thus the quantity of exhaust gas flowing into turbine 31 of high-pressure turbo-charger 30 decreases and high pressure exhaust gas flows directly into turbine 41 of low-pressure turbo-charger 40 from exhaust pipe 34. As a result, the pressure within low-pressure charging pipe produced by low-pressure turbo-chargers 40, 80 increases along the broken line k-f in FIG. 15 while the charging pressure produced by high-pressure turbo-charger 30 decreases, so that the pressure within charging pipe 36 decreases along the broken line c-f in the same figure.

When engine speed reaches 1800 rpm, exhaust switching valve 39 is completely opened, all the exhaust gas from exhaust pipe 34 flows only to turbines 41, 81 of low-pressure turbo-chargers 40, 80 and high-pressure turbo-charger 30 stops its function. The charging pressure produced by low-pressure turbo-chargers 40, 80 is at point f where it is equal to that at point a of FIG. 9. At that time, the charging air flows from low-pressure charging pipe 38 via charging bypass 60 to open check valve 47 to thereby flow into charging pipe 36.

When the charging pressure lowers from point c to point f in FIG. 15, namely, from $P_1$ to $P_2$ in FIG. 10, in the turbo-charger engine system of this invention, the pressure within charging pipe 36 lowers, so that the pressure within pneumatic cylinder chamber 54' also lowers piston 57 is moved rightward by spring 58, adjusting lever 26 is turned counterclockwise around shaft 27, adjustable coupler 25 is moved leftward, so that the timing at which rotary valve 11 is closed is retarded, the compression stroke starts from point b of FIG. 16 to prevent a decrease in the intake air quantity at an engine speed of 500 rpm, so that as described before the average effective pressure shown, namely, the torque produced, is maintained at substantially the same value as shown by point 1 in FIG. 15 in spite of a rapid change in the charging pressure.

When engine speed further increases beyond 1800 rpm, the charging pressure increases in accordance with the charging pressure curve f-g of FIG. 15 along the characteristic of low-pressure turbo-charger 40 but, as described above, the combustion pressure is prevented from exceeding the highest allowable pressure within the engine by adjusting the timing at which rotary valve 11 is closed, the torque curve becomes l-h of FIG. 15 by adjusting a fuel supply quantity, and a desirable continuous b-e-l-h torque characteristic for a vehicle engine in which the torque is constant in spite of a change in the engine speed is obtained.

While the operation of the embodiment of FIG. 7 at the full load operation of the engine has been described so far, the operation of the engine system under partial load will now be described.

The charging pressure supplied by the turbo-chargers lowers as the energy of exhaust gas decreases, but the flow of exhaust gas increases with an increase in the engine speed. Therefore, the charging pressure at point a is produced along the dot-dashed line a-x, as shown in FIG. 15. Similarly, the charging pressure at point c is produced along the dot-dashed line c-y, and the charging pressure at point f is produced along the dot-dashed line f-z. Therefore, the engine speed which produces a charging pressure corresponding to point c which starts to open exhaust switching valve 39 changes along the dot-dashed line c-y, the engine speed producing a charging pressure corresponding to point f at which exhaust switching valve 39 is completely opened changes in accordance with the corresponding load along the dot-dashed line f-z. Therefore, rapid opening of exhaust switching valve 39 and retardation in the acceleration of low-pressure turbo-charger due to that rapid switching valve opening, a decrease in the charging pressure due to the retardation of the acceleration and a temporary decrease in the torque are prevented, as are not the case with the conventional system.

In the embodiment of FIG. 7 line 63 is moved rightward when the load regulator is under full load. In the embodiment of FIG. 8, by counterclockwise rotation of lever 49 at engine speed of 1500 rpm, exhaust switching valve 39 starts to open while under low load, line 63 moves leftward to rotate auxiliary lever 62 clockwise around pin 61', so that link 48 is moved leftward to increase the engine speed which opens exhaust switching valve 39 using governor 53.

In the embodiment of FIG. 9, the operation is performed by the charging pressure, so that as mentioned above, exhaust switching valve 39 starts to open along the dot-dashed lines c-y and f-z of FIG. 15, as mentioned above, and then open the valve 39 fully.

In the turbo-charger engine of FIG. 7, the compression pressure in the engine can be adjusted so as to be constant in a range not exceeding the highest allowable pressure within the engine in substantially the entire range of engine operations. Furthermore, a fuel injection quantity per cycle is reduced under low load to increase the excess air factor to thereby improve the thermal efficiency so as to approach the air cycle and hence improve the thermal efficiency under intermediate and low loads desirable for a vehicle engine over substantially the entire area of engine operations.

I claim:

1. A turbo-charger engine system for an engine, said system comprising an exhaust pipe leading from the engine and a charging pipe leading to the engine, a plurality of turbo-chargers connected in series with the engine in a communication manner, said plurality of turbo-chargers comprising a high-pressure turbo-charger and at least one low pressure turbo-charger, said high-pressure turbo-charger being in communication with said exhaust pipe and said charging pipe, a low-pressure exhaust pipe providing communication from said high-pressure turbo-charger to said low pressure turbo-charger and a low-pressure charging pipe providing communication from said low-pressure turbo-charger to said high-pressure turbo-charger, an exhaust bypass providing communication directly between the exhaust pipe and the low-pressure turbo-charger and bypassing the high-pressure turbo-charger, a charging bypass providing communication from said low-pressure charging pipe to said charging pipe and bypassing the high-pressure turbo-charger, an exhaust switching valve provided in the exhaust bypass for selectively disabling at least one said turbo-charger in response to a selected engine operating condition, a check valve provided in the charging bypass and an actuator operative in accordance with the state of engine operation for opening the exhaust switching valve, the improvement comprising a rotary valve provided in an intake passageway intermediate the charging pipe and the engine, pressure measuring means in communication with the charging pipe for sensing charging pressure in the charging pipe, opening and closing timing adjustment means operatively connected to the pressure measuring means and to the rotary valve, wherein the rotary valve is closed in the course of an intake stroke via the opening and closing timing adjusting mechanism operative in accordance with the charging pressure.

2. A turbo-charger system as claimed in claim 1 further comprising an accelerator linkage extending between the exhaust switching valve and the timing adjusting mechanism, wherein said exhaust switching valve is governed by an accelerator linkage to the timing adjusting mechanism so as to enable the power output of the engine to be varied.

3. A turbo-charger system as claimed in claim 1 wherein at least one said turbo-charger is arranged to be gradually disabled by said exhaust switching valve in dependence upon at least the charging pressure in the charging pipe.

4. A turbo-charger system as claimed in claim 3 wherein said exhaust switching valve is further operative in response to engine exhaust pressure.

5. A turbo-charger system as in claim 3 further comprising a plurality of exhaust bypasses communicating with the exhaust pipe and bypassing a selecting one of said turbo-chargers, an exhaust switching valve in each said exhaust pipe comprising one said exhaust switching valve for gradually opening the respective exhaust bypass and thereby disabling at least one said turbo-charger in dependence upon an engine operating condition.

* * * * *